US011817225B2

(12) United States Patent
Fisher et al.

(10) Patent No.: US 11,817,225 B2
(45) Date of Patent: Nov. 14, 2023

(54) FUNCTIONALLY GRADED LATTICE CERMET FUEL STRUCTURE WITH SHAPE CORRESPONDING TO A MATHEMATICALLY-BASED PERIODIC SOLID, PARTICULARLY FOR NUCLEAR THERMAL PROPULSION

(71) Applicant: BWXT Advanced Technologies LLC, Lynchburg, VA (US)

(72) Inventors: Benjamin D. Fisher, Lynchburg, VA (US); John R. Salasin, Lynchburg, VA (US); Craig D. Gramlich, Forest, VA (US); Jonathan K. Witter, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 17/852,434

(22) Filed: Jun. 29, 2022

(65) Prior Publication Data
US 2022/0351870 A1    Nov. 3, 2022

Related U.S. Application Data

(62) Division of application No. 16/835,388, filed on Mar. 31, 2020, now Pat. No. 11,424,041.

(Continued)

(51) Int. Cl.
*G21C 3/04* (2006.01)
*G21C 3/42* (2006.01)
(Continued)

(52) U.S. Cl.
CPC .............. *G21C 3/044* (2013.01); *G21C 3/04* (2013.01); *G21C 3/42* (2013.01); *G21C 3/28* (2013.01);
(Continued)

(58) Field of Classification Search
CPC . G21C 3/044; G21C 3/04; G21C 3/42; G21C 3/28; G21C 3/30; G21C 21/02; G21C 3/048; G21D 5/02
(Continued)

(56) References Cited

U.S. PATENT DOCUMENTS 3,145,150 A    8/1964    Gylfe
3,287,225 A    11/1966    Ackroyd et al.
(Continued)

FOREIGN PATENT DOCUMENTS

JP    2004-301831 A    10/2004
WO    2015/200257 A1    12/2015
WO    2017/192508 A1    11/2017

OTHER PUBLICATIONS

Haertling et al., "Literature review of thermal and radiation performance parameters for high-temperature, uranium dioxide fueled cermet materials", J. of Nuc. Mat., 366 (2007) 317-335; https://doi.org/10.1016/j.jnucmat.2007.03.024.
(Continued)

*Primary Examiner* — Jack W Keith
*Assistant Examiner* — Daniel Wasil
(74) *Attorney, Agent, or Firm* — Morgan, Lewis & Bockius LLP

(57) ABSTRACT

Nuclear propulsion fission reactor structure has an active core region including fuel element structures, a reflector with rotatable neutron absorber structures (such as drum absorbers), and a core former conformal mating the outer surface of the fuel element structures to the reflector. Fuel element structures are arranged abutting nearest neighbor fuel element structures in a tri-pitch design. Cladding bodies defining coolant channels are inserted into and joined to lower and upper core plates to from a continuous structure that is a first portion of the containment structure. The body
(Continued)

of the fuel element has a structure with a shape corresponding to a mathematically-based periodic solid, such as a triply periodic minimal surface (TPMS) in a gyroid structure. The nuclear propulsion fission reactor structure can be incorporated into a nuclear thermal propulsion engine for propulsion applications, such as space propulsion.

17 Claims, 20 Drawing Sheets

Related U.S. Application Data

(60) Provisional application No. 62/827,706, filed on Apr. 1, 2019.

(51) Int. Cl.
```
    G21D 5/02      (2006.01)
    G21C 21/02     (2006.01)
    G21C 3/28      (2006.01)
    G21C 3/30      (2006.01)
```

(52) U.S. Cl.
 CPC ............ *G21C 3/30* (2013.01); *G21C 21/02* (2013.01); *G21D 5/02* (2013.01)

(58) Field of Classification Search
 USPC ............... 376/220, 318, 351, 455, 458, 909
 See application file for complete search history.

(56) References Cited

U.S. PATENT DOCUMENTS

| | | | |
|---|---|---|---|
| 4,146,430 A | 3/1979 | Berringer | |
| 4,983,351 A | 1/1991 | Tower et al. | |
| 5,349,618 A | 9/1994 | Greenspan | |
| 5,991,354 A * | 11/1999 | Van Swam | G21C 3/623 376/455 |
| 8,526,566 B1 | 9/2013 | Youchison et al. | |
| 8,920,871 B1 | 12/2014 | Youchison et al. | |
| 9,793,010 B2 | 10/2017 | van Staden | |
| 2012/0140868 A1 | 6/2012 | Kauchi et al. | |
| 2020/0027578 A1* | 1/2020 | O'Brien | G21C 3/044 |
| 2020/0353681 A1 | 11/2020 | Fisher et al. | |
| 2020/0373024 A1 | 11/2020 | Gramlich | |

OTHER PUBLICATIONS

Hickman et al., "Fabrication and Testing of CERMET Fuel Materials for Nuclear Thermal Propulsion", 48th AIAA/ ASME/SAE/ASEE Joint Propulsion Conference & Exhibit (Jul. 30-Aug. 1, 2012), 5 pages; https://doi.org/10.2514/6.2012-3819.
Hodkin et al., "Surface and Interfacial Properties of Non-Stoichiometric Uranium Dioxide", J. of Nuc. Mat., 67 (1977) 171-180.
Kumar, "Development, Fabrication, and Characterization of Fuels for the Indian Fast Reactor Programme", Fast Reactors and Related Fuel Cycles International Conferences, pp. 17-31 (2013).
Wongsawaeng et al., "Liquid-Metal Bond for LWR Fuel Rods", Nuclear Technology, (2007) 159:3, 279-291; doi: 10.13182/NT07-A3876.
Eustathopoulos, "Wetting by Liquid Metals—Application in Materials Processing: The Contribution of the Grenoble Group", Metals 2015, 5, 350-370.; doi:10.3390/met5010350.
Next generation design & engineering software, 15 pages; retrieved from the internet: <URL: https://www.ntopology.com/>.
Brakke, Triply Periodic Minimal Surfaces; retrieved from the internet: <URL: http://facstaff.susqu.edu/brakke/evolver/examples/periodic/periodic.html>.
Lattice Topologies, Autodesk Knowledge Network (Mar. 21, 2017) 8 pages, retrieved from the internet: <URL: http://help.autodesk.com/view/NETF/2017/ENU/?guid=GUID-A738117A-64B1-4613-A904-FDB6130E2EDD>.
Olander et al., "Hybride fuel behavior in LWRs", J. of Nuc. Mat., 346 (2005) 98-108.
International Search Report and Written Opinion dated Jan. 5, 2021 in PCT/US20/25948.
Szuta, "Modelling of Helium release from the highly burned fuel during annealing and impact on its migration in the Uranium Dioxide fuel during neutron irradiation", International conference on WWER fuel performance, modelling and experimental support; Varna Bulgaria, 2015. (Year: 2015).
Extended European Search Report dated Feb. 16, 2023 in European Application No. 20834323.6.

\* cited by examiner

VARYING PERIODICITY OF THE TPMS

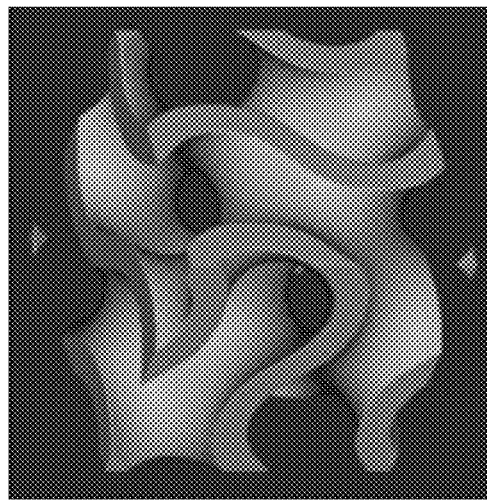
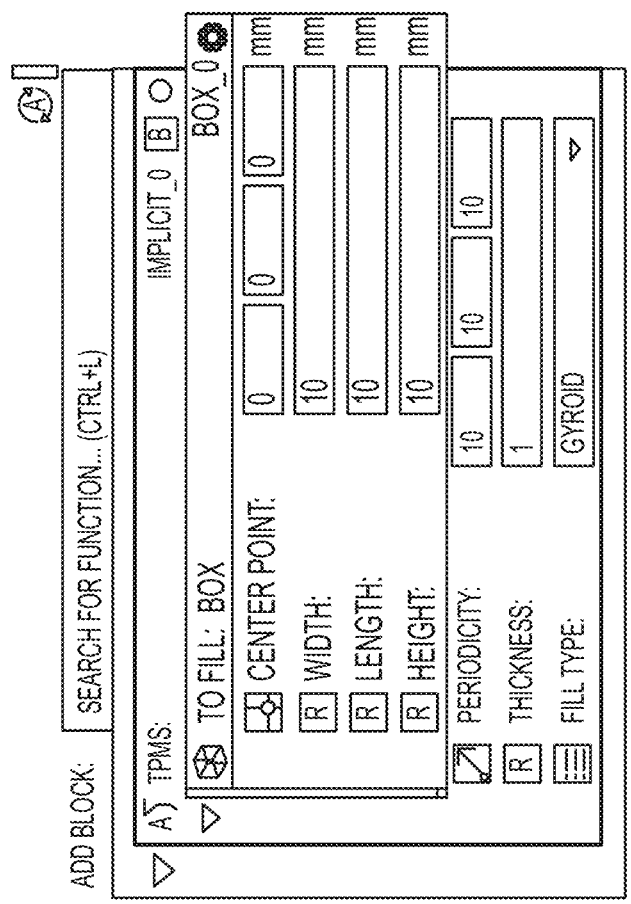
FIG. 6A (CONT 1)

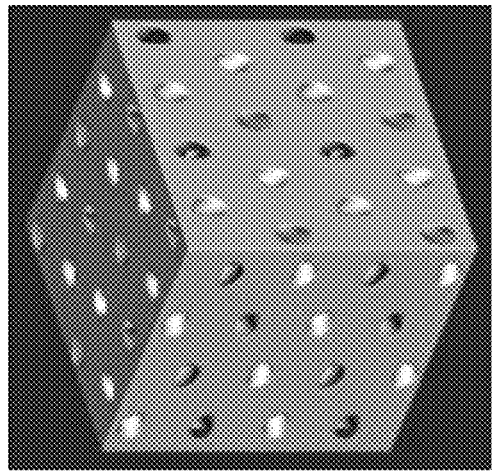
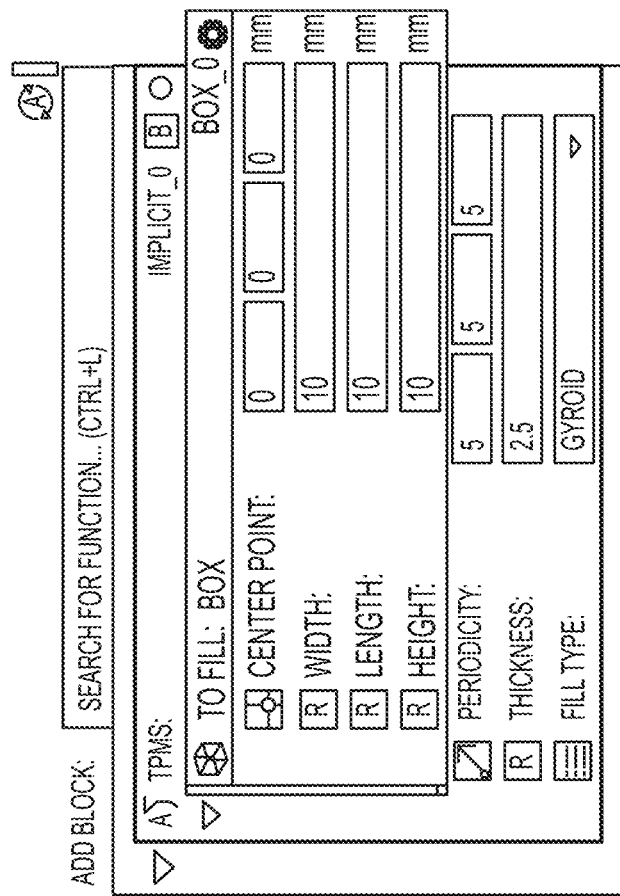
FIG. 6B *(CONT 1)*

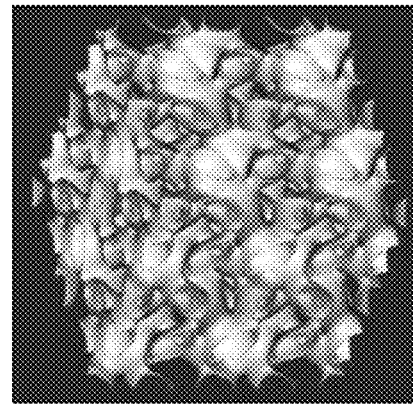
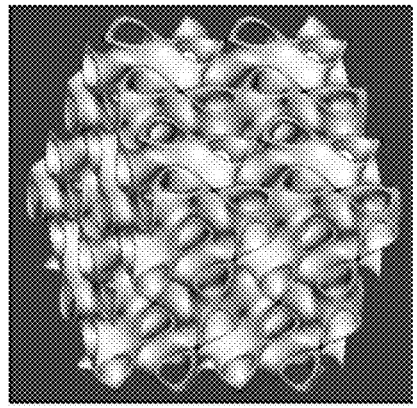
FIG. 6C (CONT 1)

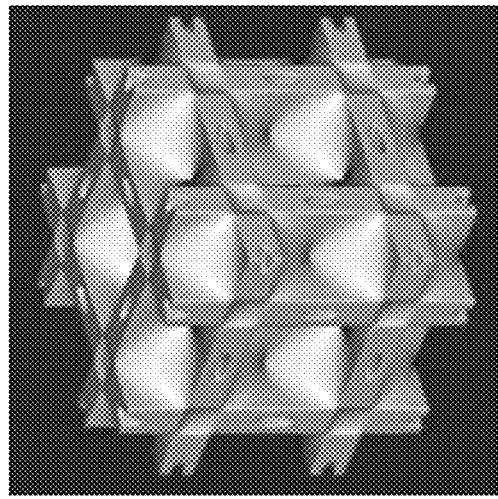
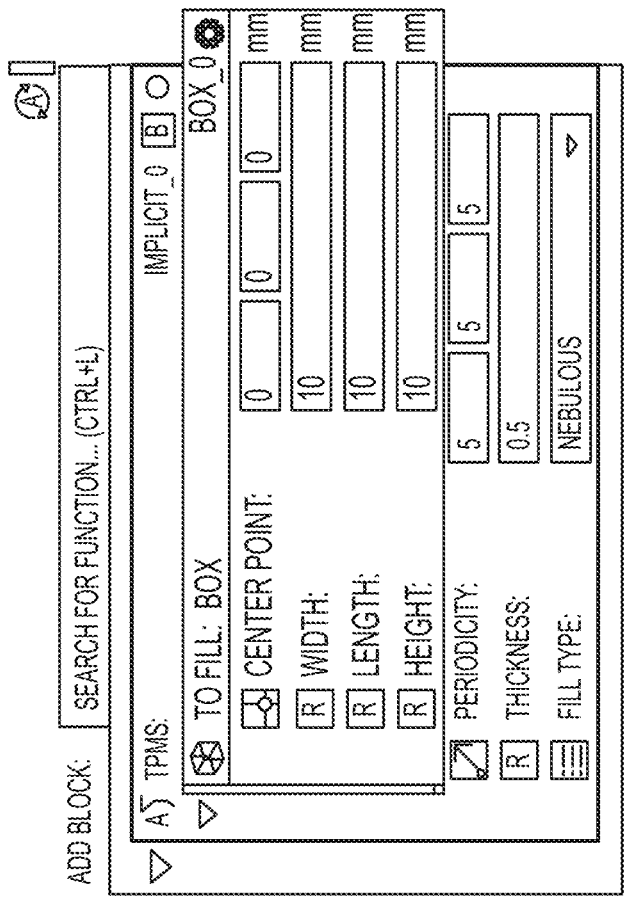
FIG. 6C (CONT 2)

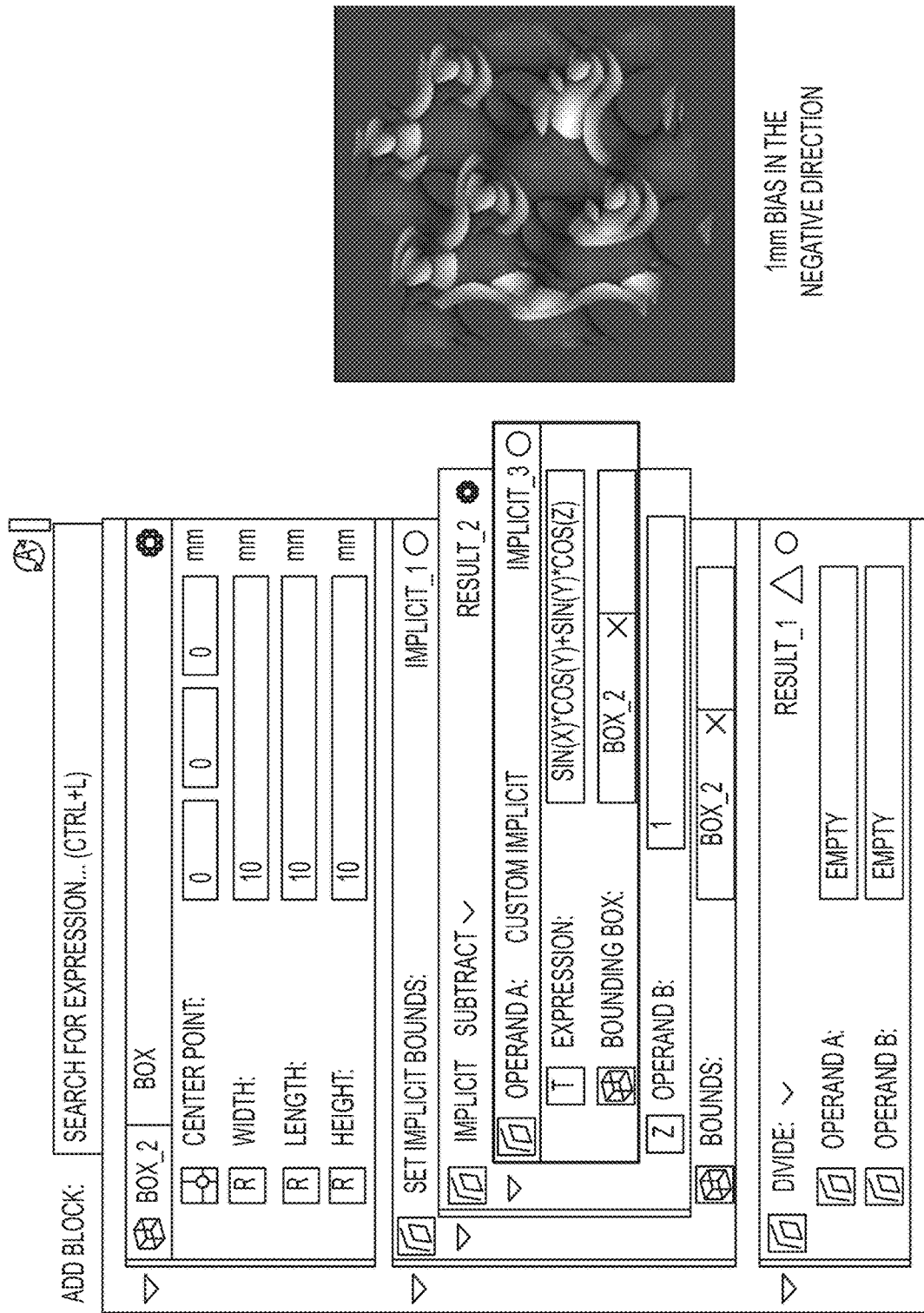
FIG. 6D (CONT 1)

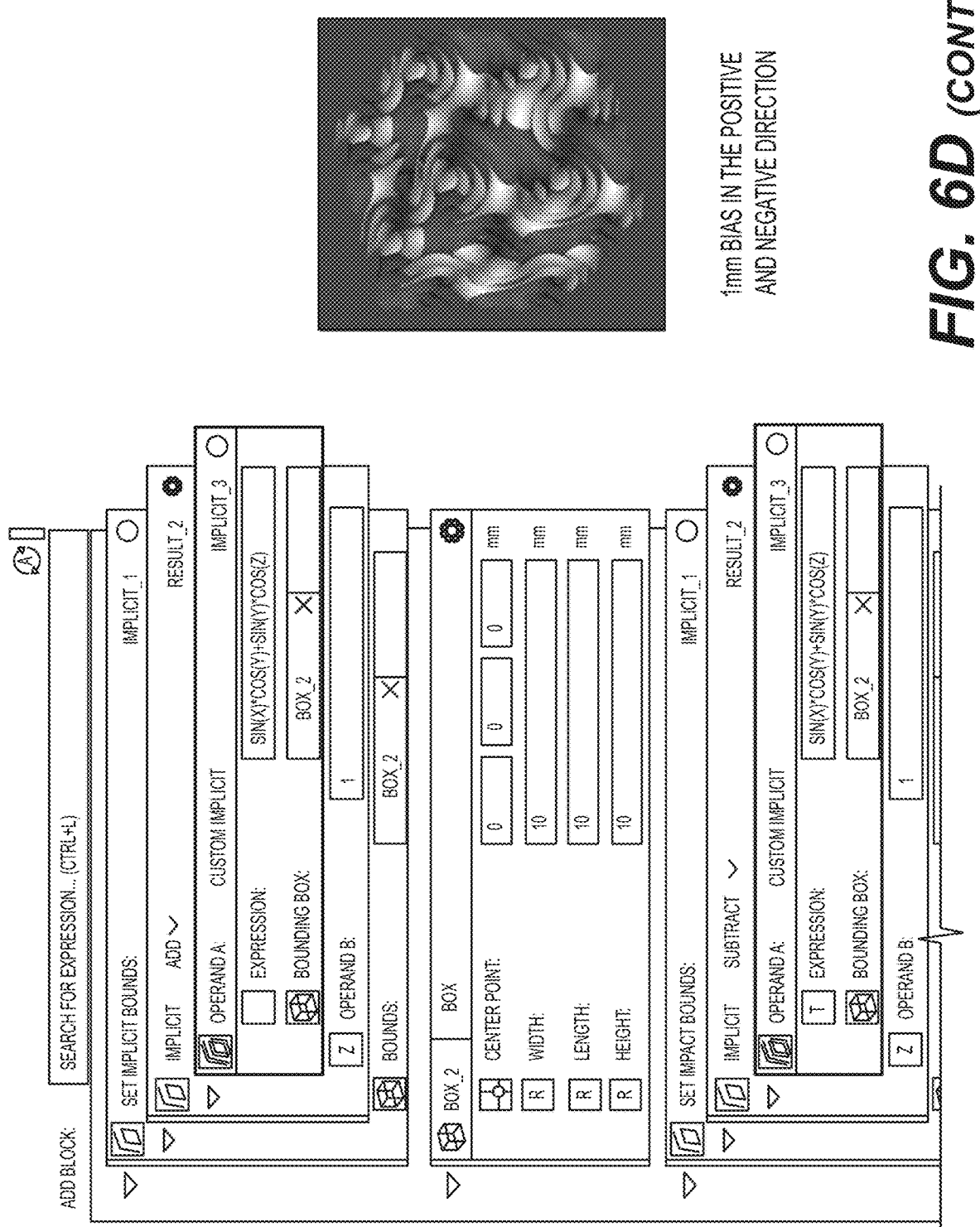
FIG. 6D (CONT 2)

FUNCTIONALLY GRADED LATTICE CERMET FUEL STRUCTURE WITH SHAPE CORRESPONDING TO A MATHEMATICALLY-BASED PERIODIC SOLID, PARTICULARLY FOR NUCLEAR THERMAL PROPULSION

RELATED APPLICATION DATA

This application is a divisional application of U.S. application Ser. No. 16/835,388 filed Mar. 31, 2020, which is based on and claims priority under 35 U.S.C. § 119 to U.S. Provisional Application No. 62/827,706, filed Apr. 1, 2019, the entire content of each of these applications is incorporated herein by reference.

TECHNICAL FIELD AND INDUSTRIAL APPLICABILITY

The present disclosure relates to a nuclear fuel segment(s) and methods to fabricate nuclear fuel segment(s) whose structure includes a network of channels defined by surfaces of a mathematically-based periodic solid. Examples of mathematically-based periodic solid include triply periodic minimal surfaces. When such a solid is made with a composition including a nuclear fissionable fuel, the structure can be used as a nuclear fuel segment in nuclear applications, such as a nuclear thermal propulsion (NTP) reactor or a terrestrial reactor. The present disclosure also relates to structures having surfaces corresponding to those of a mathematically-based periodic solid, which also maintain a specific enrichment (% enrichment per unit volume) that is constant (±2% in enrichment), on the scale of both individual nuclear fuel segments as well as the active core region and the nuclear reactor as a whole. The nuclear fuel segment(s) can be manufactured by, for example, additive manufacturing processes.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

A triply periodic minimal surface (TPMS) is a minimal surface in three-dimensional space that is invariant under a rank-3 lattice of translations. Surfaces of a TPMS have the symmetries of a crystallographic group, examples of which include cubic, tetragonal, rhombohedral, and orthorhombic symmetries. FIG. 1 shows example pairs of TPMS structures 10 arranged in rows. Each pair (i.e., pairs a to d in Row 1 and pairs e to h in Row 2) contains a base unit (or partial base unit) 20 and a plurality of base units forming a body 30. In FIG. 1, each representation of a TPMS is bounded by a cube form factor for purposes of illustration. Other images of example TPMS structures can be found at http://facstaff.susqu.edu/brakke/evolver/examples/periodic/periodic.html, the contents of which are incorporated herein by reference.

TPMS have been studied for various purposes. For example, TPMS have become popular in natural science (see A. Schoen, "Infinite Periodic Minimal Surfaces without Self-Intersections" NASA Technical Note TN D-5541 (1970), the contents of which are incorporated herein by reference, which describes that TPMS have become popular in natural science).

SUMMARY

Considering the above, it would be advantageous to have structures for nuclear fuel segments that correspond to the structures of mathematically-based periodic solid such as triply periodic minimal surfaces, and for such nuclear fuel segments to be assembled into nuclear reactors, while also preserving the structure, including the periodicity and symmetry, of the mathematically-based periodic solid. Such structures have a network of channels defined by surfaces of the mathematically-based periodic solid and can be formed of material having a composition that includes a nuclear fissionable fuel having an enrichment of up to 20%. The nuclear fissionable fuel can be distributed within the structure of the mathematically-based periodic solid so that a specific enrichment of the structure (% enrichment per unit volume) is constant (±2% in enrichment). Moreover, a constant (±2% in enrichment) specific enrichment can be uniformly present not only within a nuclear fuel segment, but can also be present across the whole of the active core region of a nuclear reactor, i.e., a plurality of nuclear fuel segments, with attendant improvements in reactor neutronics. The nuclear fuel segment(s) can be manufactured by, for example, additive manufacturing techniques In general, the disclosure is also directed to a nuclear fission reactor structure suitable for use as an engine in a nuclear-based propulsion system. In exemplary embodiments, the nuclear fission reactor structure utilizes a plurality of nuclear fuel segments each of which have a network of channels defined by surfaces of the mathematically-based periodic solid and formed of material having a composition that includes a nuclear fissionable fuel having an enrichment of up to 20% that is distributed within the structure of the mathematically-based periodic solid so that a specific enrichment of the structure (% enrichment per unit volume) is constant (±2% in enrichment). The nuclear fission reactor structure is housed in a hull of a nuclear thermal propulsion reactor and engine. A propulsion gas is used as a coolant (also called a cooling medium) for the nuclear fission reactor structure. Propulsion gas superheated in the nuclear fission reactor structure exits through a nozzle and generates thrust and impulse.

Embodiments of a nuclear fuel segment comprises a body having a structure with a shape corresponding to a mathematically-based periodic solid. Surfaces of the mathematically-based periodic solid define a plurality of channels in the body and at least a portion of the channels extend from a first outer surface of the body to a second outer surface of the body. The structure has a volumetric density of 35% to 85%, a composition of the structure includes a nuclear fissionable fuel having an enrichment of up to 20%, and a specific enrichment of the structure (% enrichment per unit volume) is constant ±2%.

Embodiments of a nuclear fuel lattice structure comprise a body having a structure including a plurality of webbings having outer surfaces that define a network of interconnected channels located within an envelope surface of the body. A baseline of the webbings is an implicit surface of a mathematically-based periodic solid. At least a portion of the channels extend from a first outer surface of the body to a second outer surface of the body, the structure has a volumetric density of 35% to 85%, a composition of the structure includes a nuclear fissionable fuel having an enrichment of up to 20%, and a specific enrichment of the structure (% enrichment per unit volume) is constant ±2%.

Embodiments of a nuclear fuel segment and embodiments of the nuclear fuel lattice structure can be incorporated into an active core region of a nuclear reactor structure, and the nuclear reactor structure can be incorporated into a nuclear thermal propulsion engine.

Embodiments of a method of manufacturing a nuclear fuel segment comprises embodying a mathematically-based periodic solid in a gridded mesh, sectioning the gridded mesh into a plurality of layers; and using the plurality of layers to control an additive manufacturing process to deposit a fissionable fuel composition to manufacture a body having a structure with a shape corresponding to the mathematically-based periodic solid. The surfaces of the mathematically-based periodic solid define a plurality of channels in the body, at least a portion of the channels extending from a first outer surface of the body to a second outer surface of the body. The structure has a volumetric density of 35% to 85%, a composition of the structure includes a nuclear fissionable fuel having an enrichment of up to 20%, and a specific enrichment of the structure (% enrichment per unit volume) is constant ±2%.

The disclosed structures and methods to create a fuel element with a TPMS structure, such as a lattice, where one can tailor the volume density to achieve optimized reactor performance. Notably, designed placement of fissionable material (such as $U^{235}$) volumetrically, rather than with enrichment changes between fuel elements, allows for optimization not only between fuel assemblies and individual fuel elements, but also within a fuel assembly and a fuel element, per se. Thus, a uranium content of the nuclear fissionable fuel can vary by spatial location in the body. For example, a content of $U^{235}$ can be increased by increasing the density of the lattice. Tailored volumetric density can be combined with biasing of the mathematically-based periodic solid to effect neutronics and other characteristics of a nuclear reactor, such as a flow rate of a medium flowing through the network of interconnected channels of the TPMS structure.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

Unless stated otherwise herein, drawings of triply periodic, minimal surfaces are bounded by a cube form factor for purposes of illustration.

DETAILED DESCRIPTION

Figure 2:
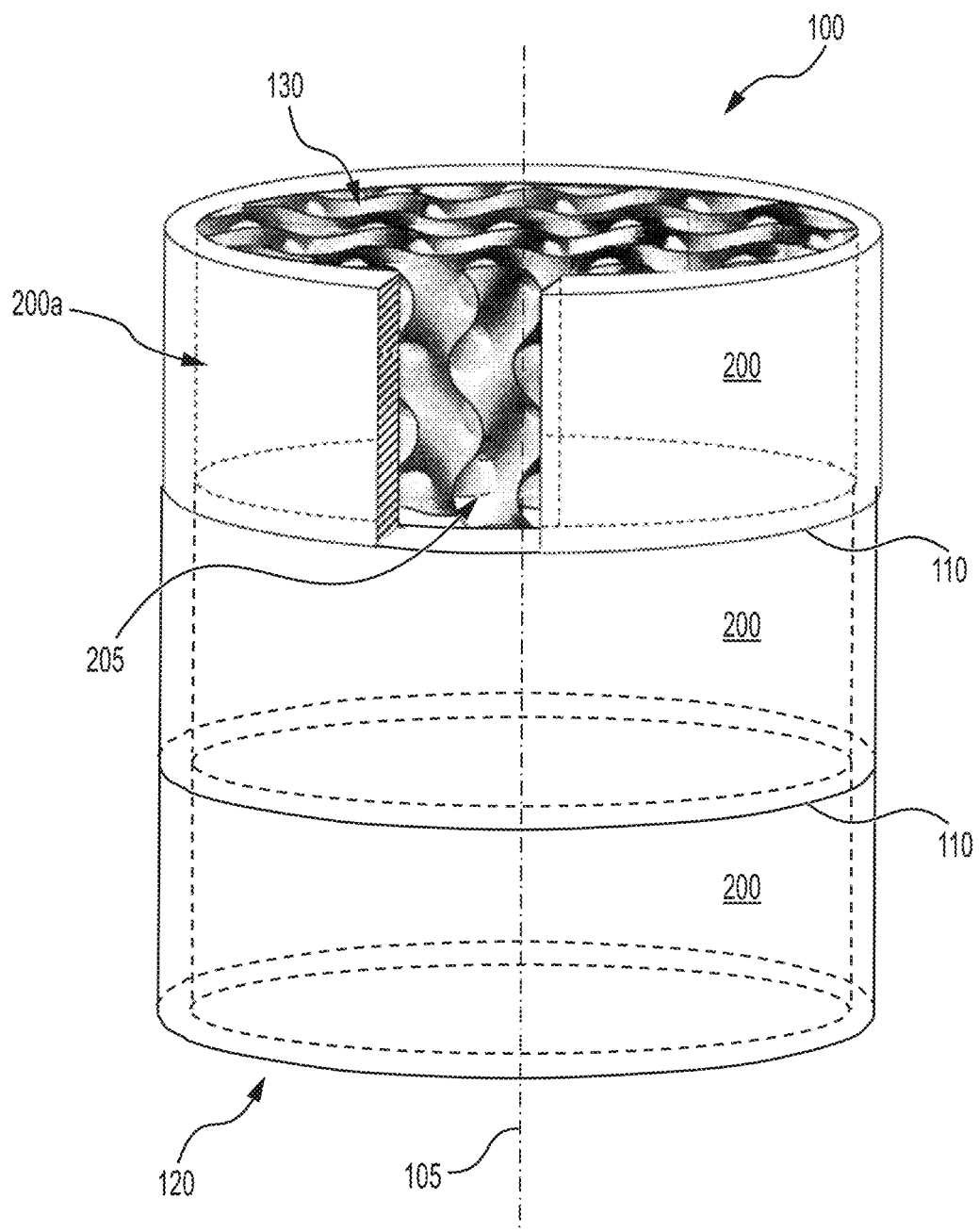
FIG. 2 schematically illustrates in perspective view an active core region including a plurality of nuclear fuel segments in which a first nuclear fuel segment is shown in partial cross-sectional view.

FIG. 2 is a schematic perspective view of an active core region 100 including a plurality of nuclear fuel segments 200. A first nuclear fuel segment 200a is shown in partial cross-sectional view in both FIG. 2 and in FIG. 3. The nuclear fuel segments 200 are assembled axially relative to axial centerline 105, which defines a longitudinal axis of the nuclear reactor structure 100. Sequentially adjacent nuclear fuel segments 200 in the active core region 100 are mated to each other at an interface 110 so that there is a path through the body 205 of the nuclear fuel segment 200 for cooling media to flow from a first side 120 of the nuclear reactor structure 100 to a second side 130 of the nuclear reactor structure 100. In FIG. 2, an active core region 100 with three nuclear fuel segments 200 is illustrated, but in alternative embodiments of the active core region 100, the number of nuclear fuel segments 200 can vary. For example, in alternative embodiments the active core region 100 can have four, five, six or other numbers of nuclear fuel segments 200. It is contemplated that up to ten, twenty or thirty nuclear fuel segments 200 can be assembled axially to form an active core region 100.

Figure 1:
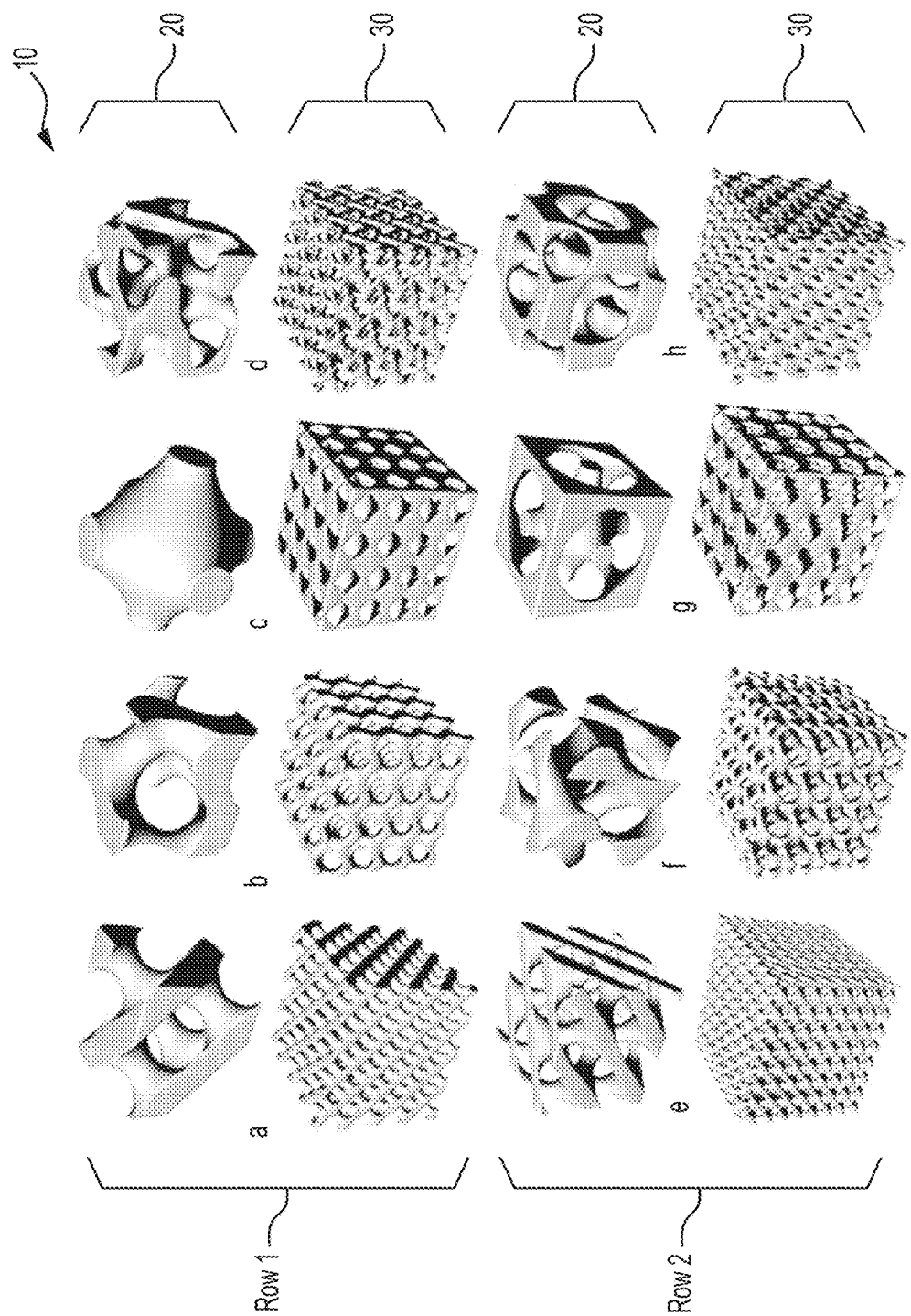
FIG. 1 schematically illustrate in perspective view various example triply periodic, minimal surfaces (marked as a to h).

Embodiments of the nuclear fuel segments 200 comprise a body 205 having a structure with a shape corresponding to a mathematically-based periodic solid. Any of the mathematically-based periodic solid known in the art can be used as the body 205, including but not limited to those shown in FIG. 1. Surfaces 210 of the mathematically-based periodic solid define a plurality of channels 215 in the body 205. While the surfaces 210 follow the form as defined by the mathematically-based periodic solid (with possible variations as discussed herein) at least a portion of the channels 215 formed by the surfaces 210 extend from a first outer surface 220 of the body 205 to a second outer surface 225 of the body 205. At least a portion of the channels, alternatively a majority of the channels and further alternatively all of the channels, provide the path through the body 205 for cooling media.

The structure of the body 205 is such that the structure has a volumetric density of 35% to 85%. In various alternative embodiments, the volumetric density is equal to or greater than 40%, 45%, 50%, or 55% and is equal to or less than 80%, 75%, 70%, or 65%, or the volumetric density is 60±10%. The volumetric density is determined by considering the amount of solid material in a unit volume of the body relative to the total volume of that unit volume, which includes both the solid material and the open spaces (i.e., the channels).

The composition of the structure of the body 205 includes a nuclear fissionable fuel having an enrichment of up to 20%. In some embodiments, the fissionable nuclear fuel composition can be high-assay low-enriched uranium (HALEU) with has a $U^{235}$ assay above 5 percent but below 20 percent. In other embodiments, the fissionable nuclear fuel composition can be highly enriched uranium (HEU) with uranium that is 20% or more $U^{235}$. A suitable fissionable nuclear fuel composition applicable to the disclosed body of the nuclear fuel segment includes uranium oxide ($UO_2$) that is less than 20% enriched, uranium with 10 wt. % molybdenum (U-10Mo), uranium nitride (UN), and other stable fissionable fuel compounds. Burnable poisons may also be included. Typically, the fissionable nuclear fuel composition is in the form of a ceramic-metal (cermet), such as $UO_2$ with W or Mo and UN with W or Mo. In some embodiments, a molten metal can also function as the "metal" portion of a cermet.

Both the physical shape of the structure of the body 205 and the composition used to manufacture the body 205 can vary so as to provide a specific enrichment of the structure (where the specific enrichment is % enrichment per unit volume) that is constant ±2%. In specific embodiments, the specific enrichment is constant at 10±2%, alternatively 13±2%, 15±2%, 16±2% or 18±2%. The specific enrichment is maintained constant ±2% by varying one or both of the physical shape of the structure of the body 205 and the composition of the material used to form the structure of the body 205. Alternatively, the and the composition. For example, for portions of the shape of the structure that are thicker, the enrichment is lower. Likewise, for portions of the shape of the structure that are thinner, the enrichment is higher. In each case, there is a balance between volume of material forming the shape of the structure and the composition used to form that volume so that and the % enrichment per unit volume (i.e., the specific enrichment) is constant ±2%.

The mathematically-based periodic solid to which the shape of the structure of the body corresponds can take any of various forms. For example, the mathematically-based periodic solid can be a triply periodic minimal surface (TPMS). In some aspects, the triply periodic minimal surface is a Schwarz minimal surface. In other aspects, the triply periodic minimal surface is a gyroid structure. In still further aspects, the triply periodic minimal surface is a lattice structure.

Figure 4A:
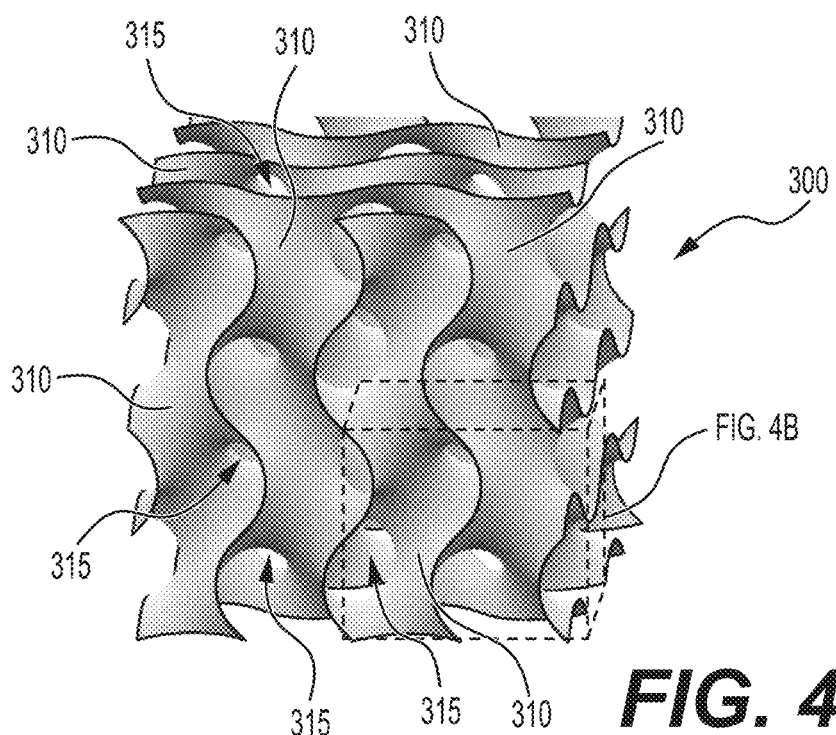
FIGS. 4A and 4B schematically illustrate in perspective view a triply periodic, minimal surface (FIG. 4A) and, in magnified view, one unit cell (FIG. 4B) of the triply periodic, minimal surface.
Figure 4B:
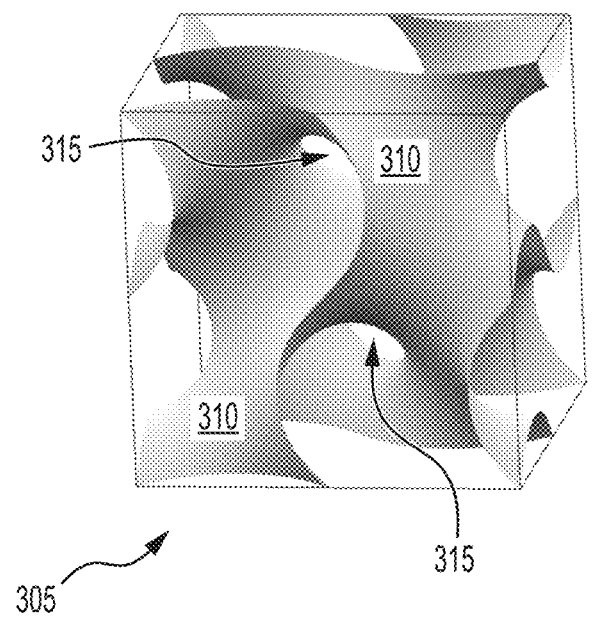

FIGS. 4A and 4B schematically illustrate in perspective view a triply periodic, minimal surface in the form of a Schoen's Gyroid Surface 300, with FIG. 4B showing multiple unit cells and the magnified view in FIG. 4B showing one unit cell 310. In both views, the surfaces 310 that form the channels 315 are readily visible.

Figure 4C:
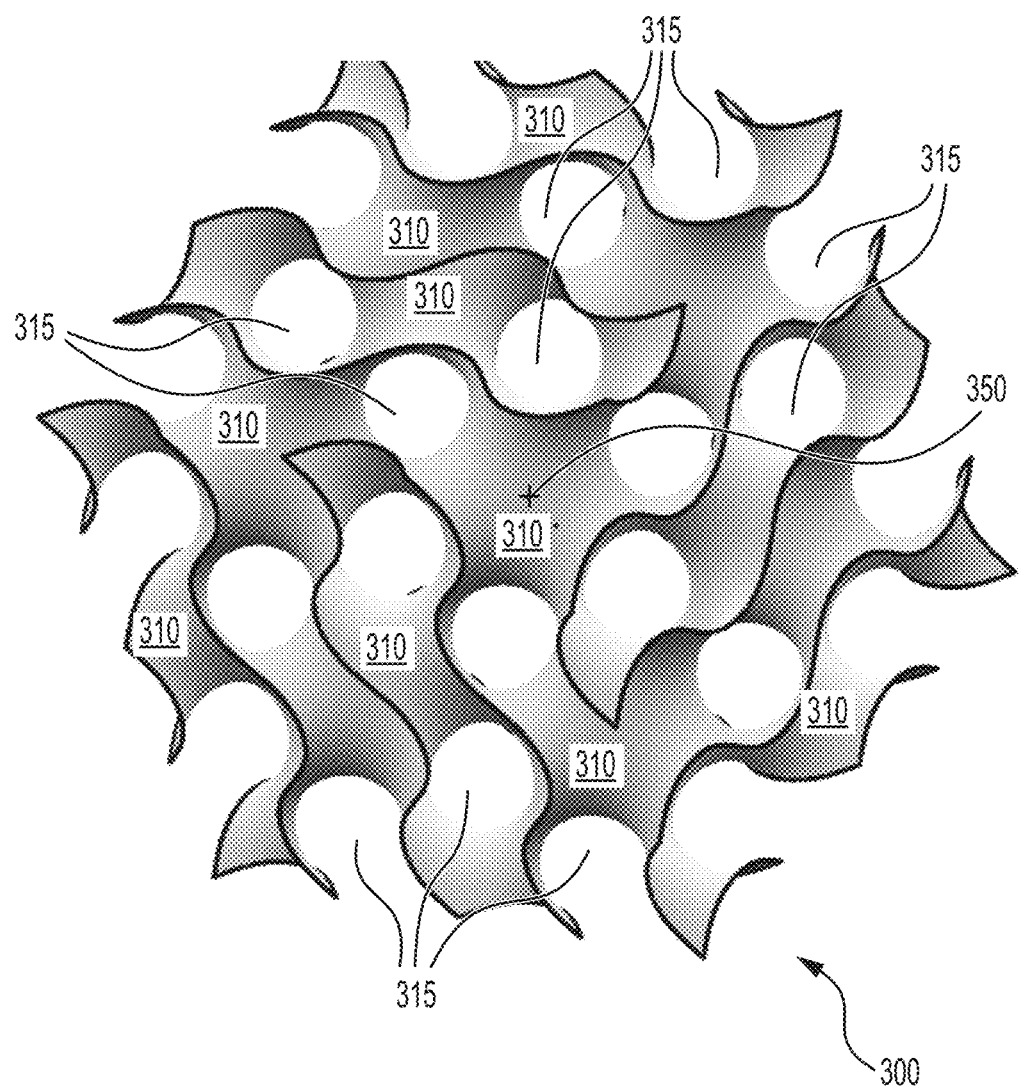
FIG. 4C schematically illustrates in perspective view the triply periodic, minimal surface of FIG. 4A as seen in a direction of the C3 symmetry axis along the cube diagonal from the upper right corner.

FIG. 4C schematically illustrates in perspective view the triply periodic, minimal surface of FIG. 4A as seen in a direction of the C3 symmetry axis along the cube diagonal from the upper right corner. The symmetry axis is shown at 350. Both the surfaces 310 and the channels 315 are visible in FIG. 4C.

Figure 5:
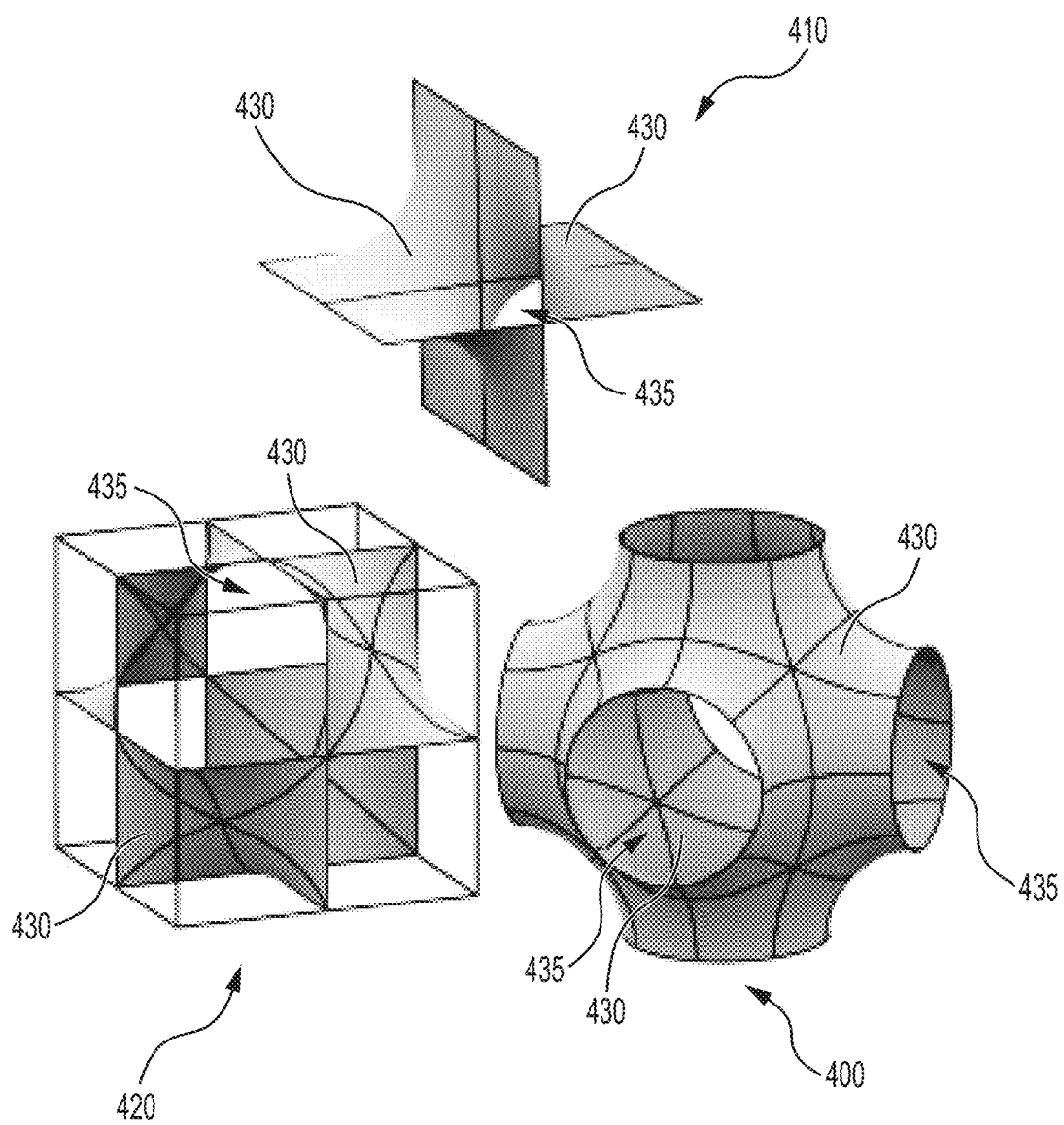
FIG. 5 schematically illustrates in perspective view examples of gyroid structures.

FIG. 5 schematically illustrates in perspective view examples of gyroid structures. The illustrated gyroid structures (each shown as a unit cubic cell) include a Schwarz P surface 400, a Schwarz D surface 410, and a Schwarz CLP surface 420. As in the Schoen's Gyroid Surface 300, the surfaces 430 that form the channels 435 are readily visible in the gyroid structures in FIG. 5.

Regarding embodiments in which the triply periodic, minimal surface (TPMS) is a lattice structure, the lattice structure can be formed by any suitable technique. In one embodiment, a gyroid forms the lattice structure. A gyroid is an infinitely connected, triply periodic, minimal surface defined by the following gyroid equation:

$$\sin x \cos y + \sin y \cos z + \sin z \cos x = 0 \quad \text{(Eq. 1)}$$

The TPMS resulting from Eq. 1 creates an implicit surface. The implicit surface of the TPMS is called the baseline and is infinitesimally thin.

Figure 6A:
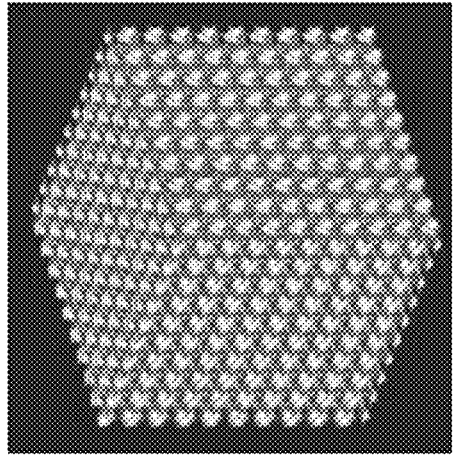
FIGS. 6A-6D illustrate effects on the lattice structure of the TPMS by varying the periodicity (FIG. 6A), the thickness (FIG. 6B), the type of TPMS (FIG. 6C), and the bias (FIG. 6D).
Figure 6A:
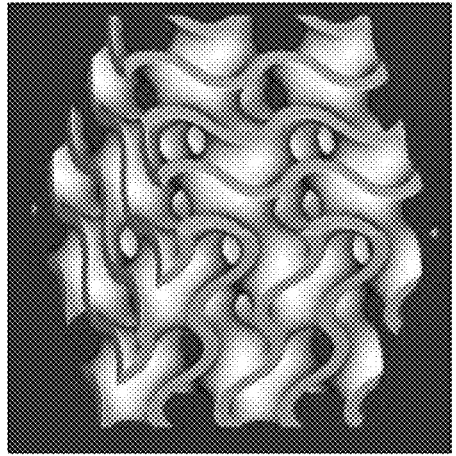
Figure 6B:
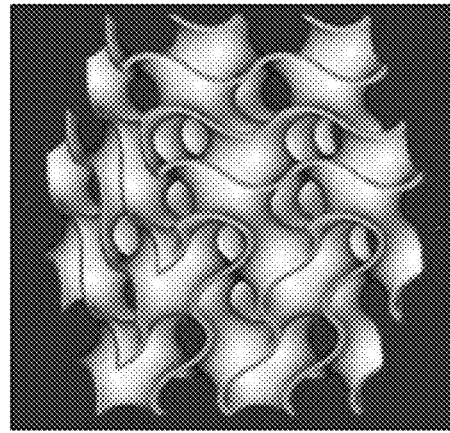
Figure 6B:
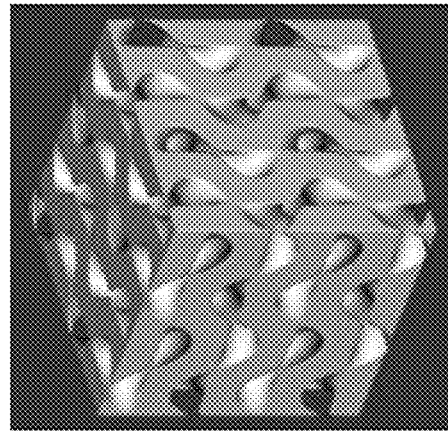
Figure 6C:
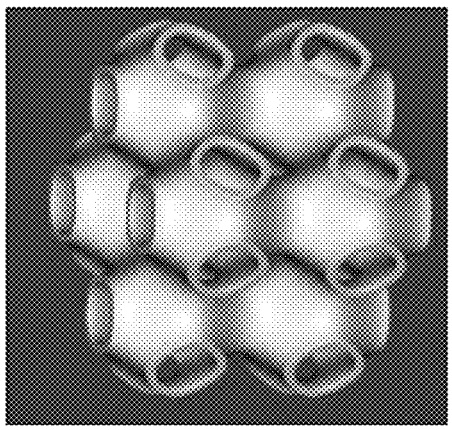
Figure 6C:
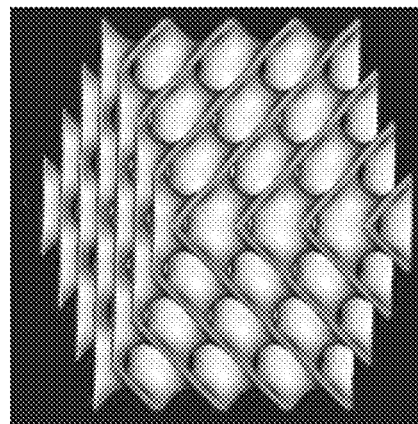
Figure 6D:
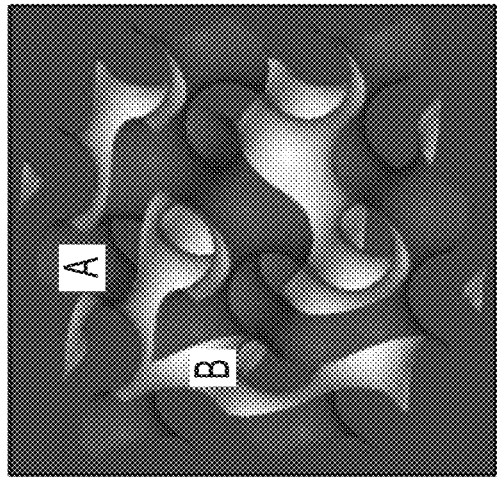
Figure 6D:
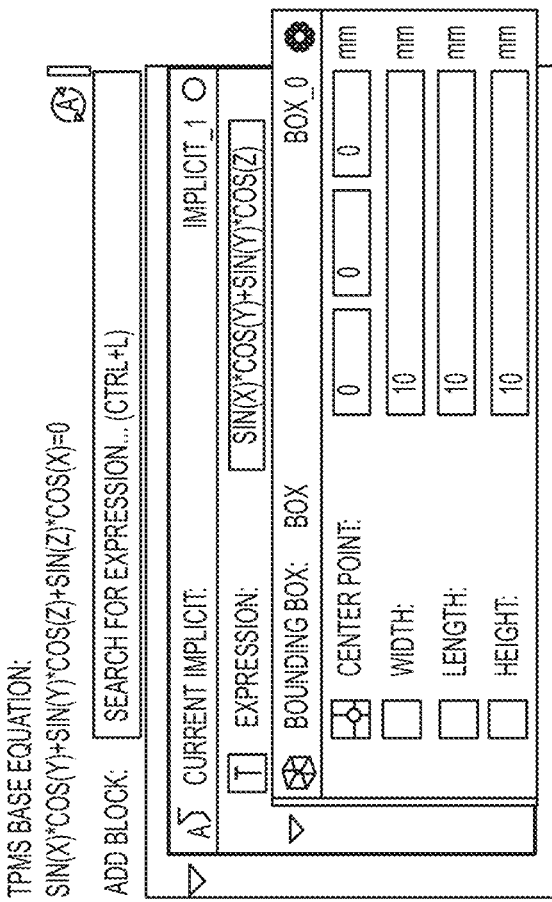

The lattice structure of the TPMS, such as a gyroid, can be varied to obtain a final structural form of the lattice structure. These variations include (i) periodicity, (ii) thickness, (iii) type of triply periodic, minimal surface (TPMS), and (iv) bias. As examples, FIGS. 6A-6D illustrate effects on the lattice structure of the TPMS by varying the periodicity (FIG. 6A), the thickness (FIG. 6B), the type of TPMS (FIG. 6C), and the bias (FIG. 6D). In FIGS. 6A to 6D, the TPMS is bounded by a cube form factor for purposes of illustration.

The characteristics of the webbings of the lattice—and thus the characteristics of the surfaces and channels of the TPMS—can be varied (relative to the baseline), for example, by broadening or thickening the webbing of the lattice, by suitably modifying the equation that represents the lattice. A forcing geometry can be applied to achieve such variations. In one example, a vector field, which has both direction and magnitude, can be applied to the gyroid equation (or to any other equation of a TPMS), which produces a volumetric density that can vary as a f(x,y,z) (which can be implemented on a per nuclear fuel segment basis or on a per active core region basis or on a per nuclear reactor structure basis). The resulting thickening of the webbing can be symmetric or asymmetric relative to the baseline and allows for varying the thickening of the webbing throughout the body to effect the heat and nuclear properties. The thickening affects the network of interconnected channels, which influences the overall temperature gradient and thermal conductivity of the body. In another variation, a bias can be applied to the gyroid equation to create converging and diverging regions within the body, which can influence the flow rate of a cooling medium traveling through the network of interconnected channels.

Using a TPMS structure and varying the lattice structure allows one to suitably locate webbing size and density, and optionally effective enrichment of any fissionable fuel material used to form the webbing, at specified locations within the lattice, by changing the density of the part in the desired region. In nuclear applications, such specified locations within the lattice corresponds to specified locations in a nuclear reactor and, therefore, using a TPMS structure and varying the lattice structure can optimize neutronics, thermal hydraulics, and stress mechanics of the reactor, particularly a NTP reactor.

Figure 3:
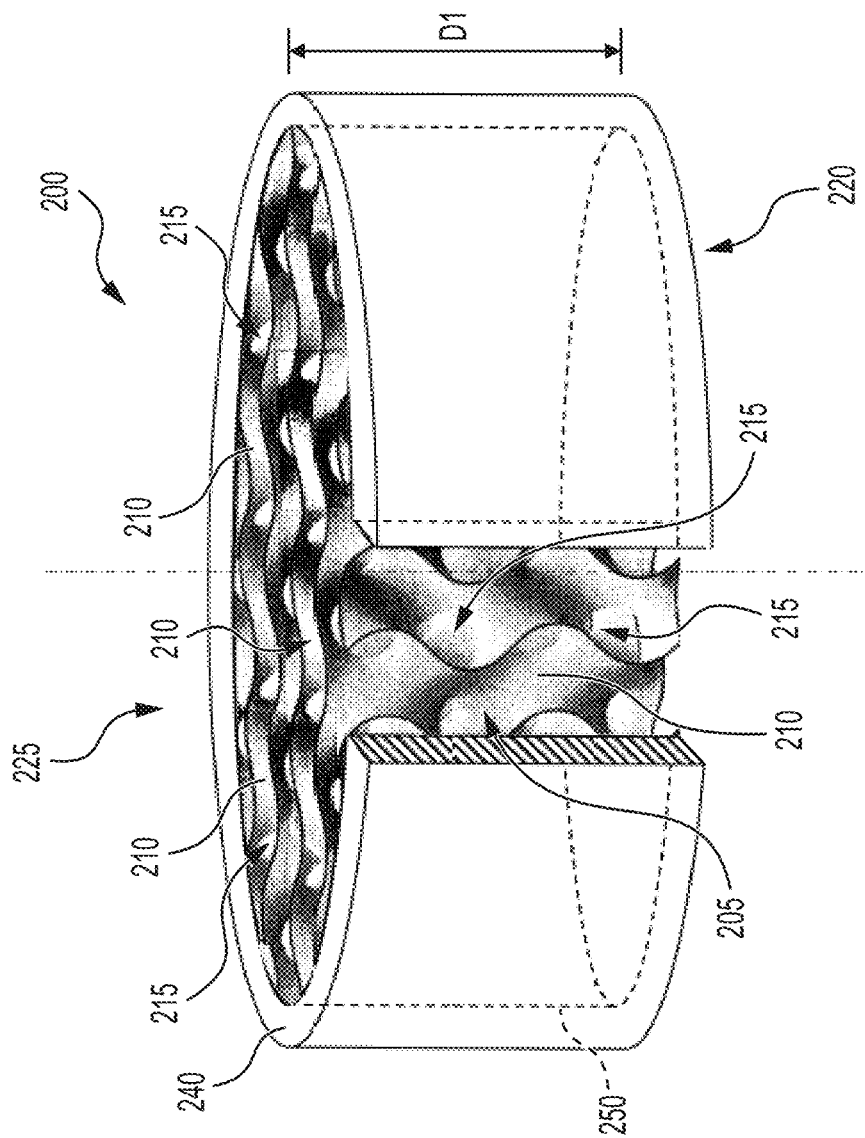
FIG. 3 schematically illustrates in perspective, partial cross-sectional view a nuclear fuel segment.

Returning to the nuclear fuel segments shown in FIGS. 2 and 3, the body 205 can optionally be enclosed, at least on a portion of the outer surfaces, by a housing. For example, the body 205 can be disc-shaped (or, considering the irregular outer surfaces of the body 205, can correspond to an envelope surface that is disc-shaped). Such a disc-shaped body 205 occupies a volume that includes a radial side surface 250 that extends an axial distance (D1) that corresponds to a thickness of the body 205 between the first outer surface 220 and the second outer surface 225. In some embodiments, the housing is a side wall 240 radially outward of the radial side surface 250 of the body 205. In other embodiments, the housing can include both a side wall and structures encasing one or both of the first outer surface 220 and the second outer surface 225. When a housing is present at either of the first outer surface 220 and the second outer surface 225, the housing can incorporate openings to allow for passage of the cooling media that flows through the channels 215 of the body 210. In some embodiments, particularly when the housing is a side wall, the housing has a composition including a neutron thermalizing material. Examples of neutron thermalizing material have compositions that include one or more of a zirconium (Zr) alloy, a beryllium (Be) alloy, or graphite. In some embodiments, the neutron thermalizing material has a composition including zirconium hydride (ZrH) or beryllium oxide (BeO).

In some embodiments, the body 205 optionally includes a cladding layer deposited on surfaces of the plurality of channels 215. The cladding is a layer (or coating) that is located between the coolant and the nuclear fuel. The cladding functions as a safety barrier that prevents radioactive fission fragments from escaping the fuel into the coolant and contaminating it. Some design constraints of cladding include neutron absorption, radiation resistance and temperature behavior. The cladding is typically made of a corrosion-resistant material with low absorption cross section for thermal neutrons. Example materials include Zircaloy or steel, although other materials may be used if suitable to the reactor conditions, such as metallic and ceramic systems (Be, C, Mg, Zr, O, and Si), as well as compositions including molybdenum, tungsten, rhenium, tantalum, hafnium and alloys thereof, including carbides. In other examples the cladding layer has a composition including a steel alloy, a zirconium alloy, a molybdenum-containing metal alloy, a molybdenum-tungsten alloy, Zircaloy-4 or Hastelloy X. In some embodiments, the cladding material can be isotope enriched to enhance reactive through reduction of isotopes with higher neutron absorption cross-sections, e.g., molybdenum enriched Mo-92 will have a less parasitic neutron absorption cross-section than elemental molybdenum. In embodiments of the disclosed nuclear fuel segments, the nuclear fuel is in the body 205 and in some aspects, the cladding is a layer located on portions of the surfaces forming the channels 215. Alternatively, in other aspects, the cladding is a layer located on all of the surfaces of the body, both surface 210 and channels 215.

The cladding can be deposited on the surfaces 210 and channels 215 after manufacture of the TPMS or can be formed integrally with the TPMS. For example, the cladding can be deposited in a vapor deposition process, such as chemical vapor deposition (CVD). Alternatively, the cladding can be deposited in a liquid based process, such as electroplating, electroless platting, or other submersive deposition process. In another example, the cladding can be formed integrally with the TPMS in an additive manufacturing process (as further disclosed herein).

Figure 7A:
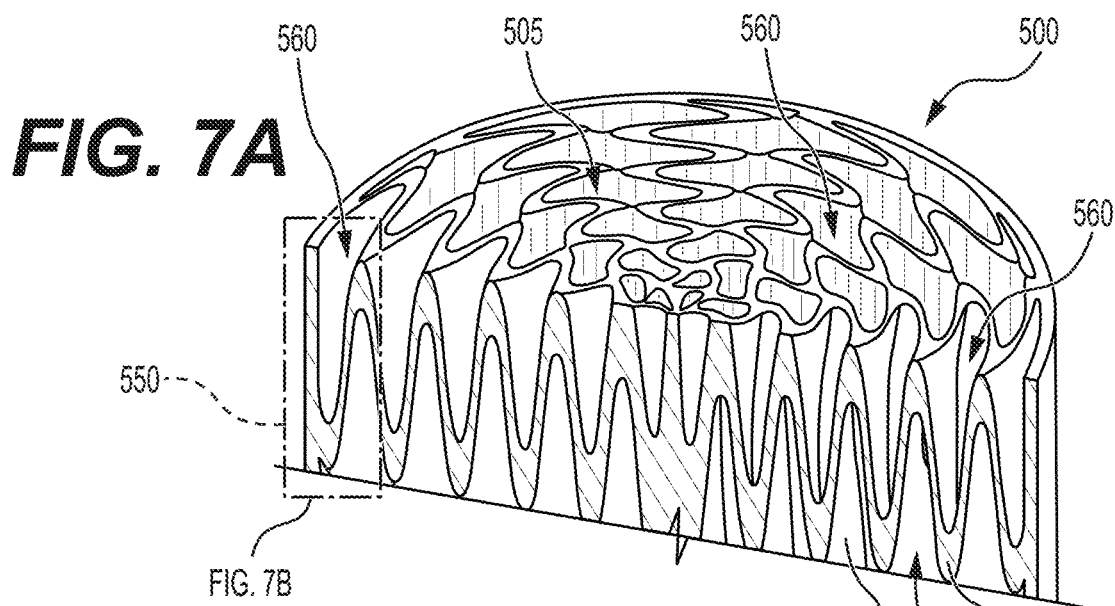
FIG. 7A is a schematic drawing showing, in perspective view, a cross-section of an example nuclear fuel segment in which the structure of the body has a gyroid form of a TPMS
Figure 7B:
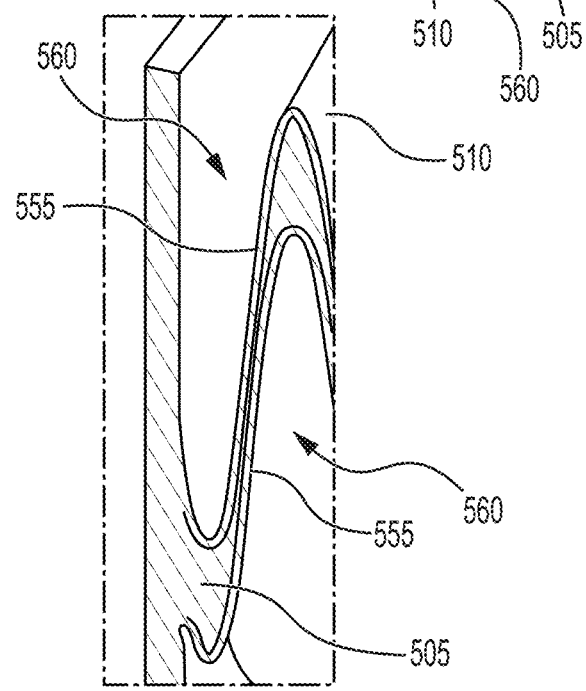
FIG. 7B is a magnified view of a portion of FIG. 7A.

FIG. 7A is a schematic drawing showing, in perspective view, a cross-section of an example nuclear fuel segment in which the structure of the body has a gyroid form of a TPMS. The cross-section of the nuclear fuel segment 500 is taken along a diameter of the body 505. In this embodiment, the surfaces 510 of the TPMS have a periodic wave structure along the cross-section. FIG. 7B is a magnified view of section 550 from FIG. 7A. FIG. 7A shows a portion of the body 505 in magnified view. FIG. 7A also schematically shows a cladding 555 deposited on the surface 510. In FIG. 7A, the cladding is on both surfaces 510 of the body, i.e., the surfaces 510 associated with the channels 560 formed on either side of the TPMS.

As previously noted, FIG. 2 is a schematic perspective view of an active core region 100 including a plurality of nuclear fuel segments 200 arranged along an axial centerline 105 defining a longitudinal axis of the nuclear reactor structure. In assembling the plurality of nuclear fuel segments 200, the plurality of channels 215 in the body 205 of adjacent nuclear fuel segments 200 are aligned to provide fluid communication from a first end surface 120 of the active core region 100 to a second end surface 130 of the active core region. In some embodiments, to assist in aligning features, such as coolant channels 215, in the body 205 of one nuclear fuel segment 200 with features in the body 205 of an adjacent nuclear fuel segment 200, alignment aids can be used. For example, clocking techniques can be applied that use projecting registry features on a surface of one nuclear fuel segment 200 that mate with or insert, for example by inserting into or being received by, receiving spaces on an abutting surface of the adjacent nuclear fuel segment 200. Other registry features can also be used including pins, notches, shaped projections and so forth. In addition, other alignment aids such as alignment channels or scribe marks can be used. Also, the alignment aids can be located at one or more of various suitable surfaces, including abutting internal surfaces, such as on a surface of the side wall 240 forming the interface 110, and continuous outer side surfaces.

Figure 10:
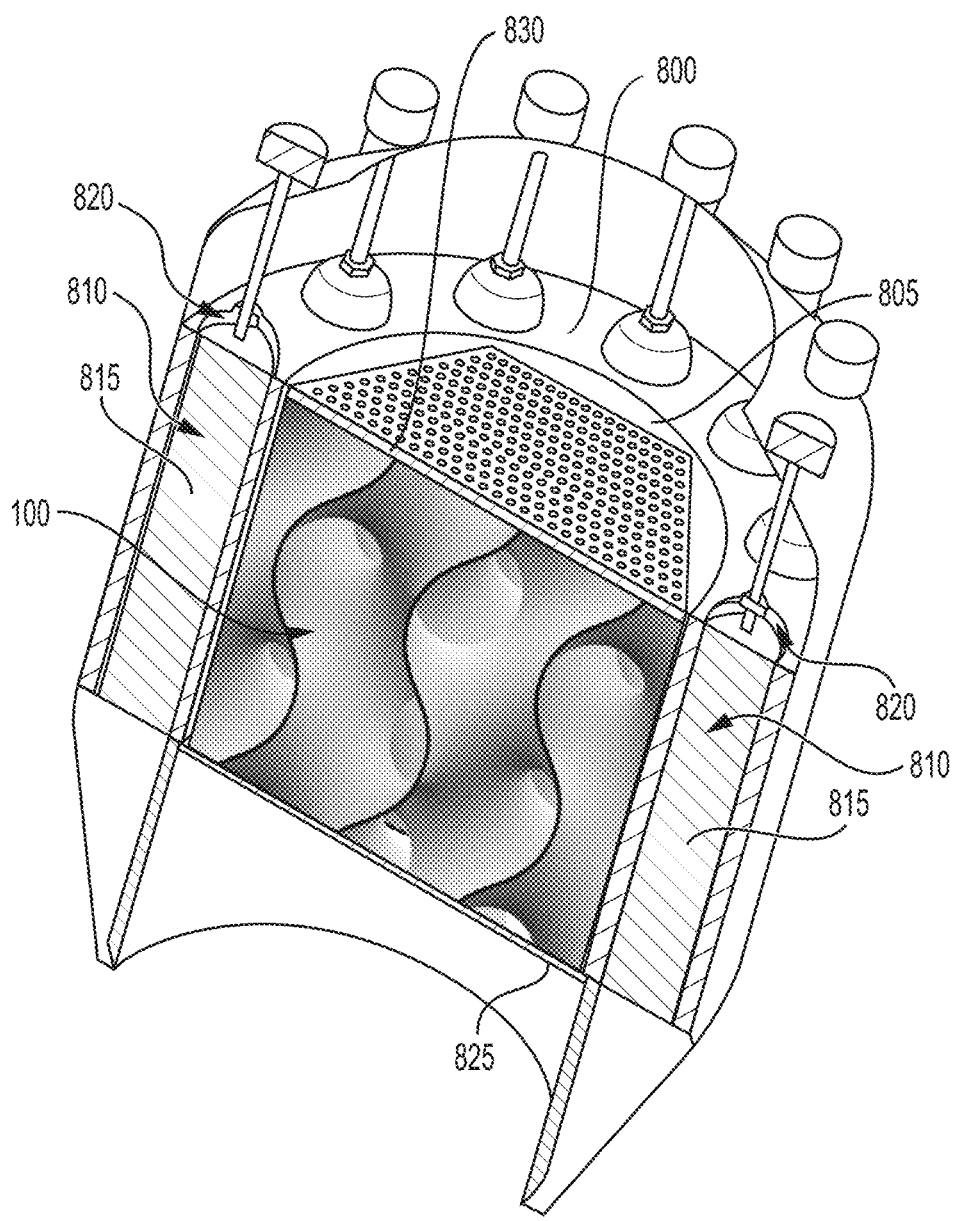
FIG. 10 schematically illustrates features in an embodiment of a nuclear propulsion fission reactor structure.

Typically, when forming the nuclear reactor structure, the active core region 100 is assembled with other components, examples of which are shown in FIG. 10. For example, embodiments of a nuclear reactor structure can further comprise a reflector 800 radially outward of the core former 805 and having a radially inner surface oriented toward the active core region 100 and (optionally) a core former 805 radially outward of the active core region 100 and radially inward of the reflector 800. The core former 805 provides conformal mating between the radially outer surface of the active core region 100 and the radially inner surface of reflector 800. For example, first radially inward surface of the core former 805 can conformally mate to a circular or non-circular outer surface of the active core region 100. This is particularly useful where the outer surface of the active core region 100 has an irregular surface or has a series of joined planar surfaces and the core former 805 is used to transition this shape to the radially inner surface of a circular reflector 800.

Embodiments of a nuclear reactor structure can also further comprise a plurality of neutron absorber structures 810 located within a volume of the reflector 800. The neutron absorber structures 810 can include a neutron absorber body movable, such as by rotation, between a first position and a second position, the first position being radially closer to the active core region than the second position. Movement of the neutron absorber body between the first position and the second position controls the reactivity of the active core region 100. In exemplary embodiments, the first position is radially closest to the active core region and the second position is radially farthest from the active core region. In still further exemplary embodiments, at the radially closest position, each neutron absorber body is radially equidistant from the axial centerline 105 of the active core region 100. In exemplary embodiments, the neutron absorber body has a composition including beryllium, beryllium oxide, graphite, or combinations thereof.

In a specific embodiment, cylindrical tubes are angularly distributed within an internal volume of the reflector. Each of the neutron absorber structures 810 includes a cylindrical drum 815 that is encased in a respective tube 820. The neutron absorber body occupies a first portion of the cylindrical drum and a second portion of the cylindrical drum is a secondary reflector. The cylindrical drum can be rotated about its cylindrical axis between a first position and a second position, the first position being radially closer to the active core region than the second position. In other embodiments, other radial positions and/or movement directions can be implemented as long as the various positions to which the neutron absorber body can be moved provides control of the reactivity of the active core region 100.

Figure 8:
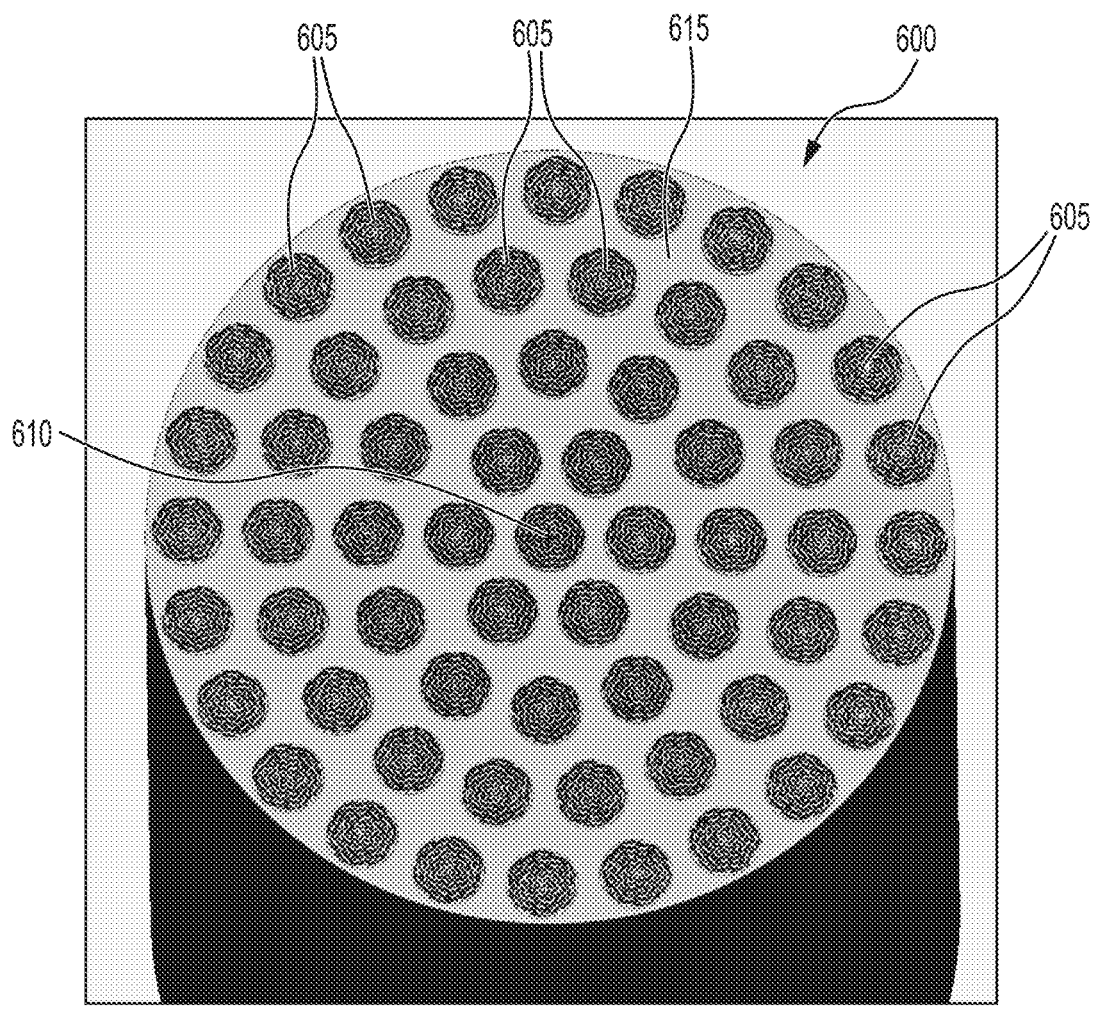
FIG. 8 is a top, perspective view of an embodiment of a nuclear reactor structure including a plurality of nuclear fuel segments distributed in a solid moderator block.

In other embodiments, the nuclear fuel segments can be distributed within a solid moderator block. FIG. 8 is a top, perspective view of an embodiment of a nuclear reactor structure 600 including a plurality of nuclear fuel segments 605 radially and circumferentially distributed relative to a longitudinal axis 610 of the nuclear reactor structure 600. The nuclear fuel segments 605 illustrated in FIG. 8 are each a plurality of axially stacked nuclear fuel segments in which the structure of the body of each nuclear fuel segment has a gyroid form of a TPMS, an example of which is shown in FIG. 7A in magnified view. The nuclear fuel segments 605 are separated by a solid moderator block 615, such as zirconium hydride.

Embodiments of a nuclear reactor structure can also further comprise a lower core plate 825 at a first end 120 of the active core 100 and an upper core plate 830 at a second end 130 of the active core 100. Each of the lower core plate and the upper core plate comprise a plurality of holes for passage of a coolant medium, such as a propulsion gas in a NTP reactor. The core plates can be joined to a portion of the housing, such as the upper edge of side wall 240, of either the uppermost or lowermost nuclear fuel segment 200 by any suitable means, such as be welding, including resistance welding, full-penetration welding, or by suitable epoxy systems, such as J-B-weld®. The plurality of holes in the core plates may or may not correspondingly mate to channels 215 in the adjacent bodies 205. In instances where the plurality of holes in the core plates do not correspondingly mate to channels 215 in the adjacent bodies 205, a plenum can be interposed between the outer surface 225 facing the core plate and the surface of the core plate facing the body 205 to allow coolant medium from the channels 215 to flow to and through the plurality of holes in the respective core plate.

Figure 9:
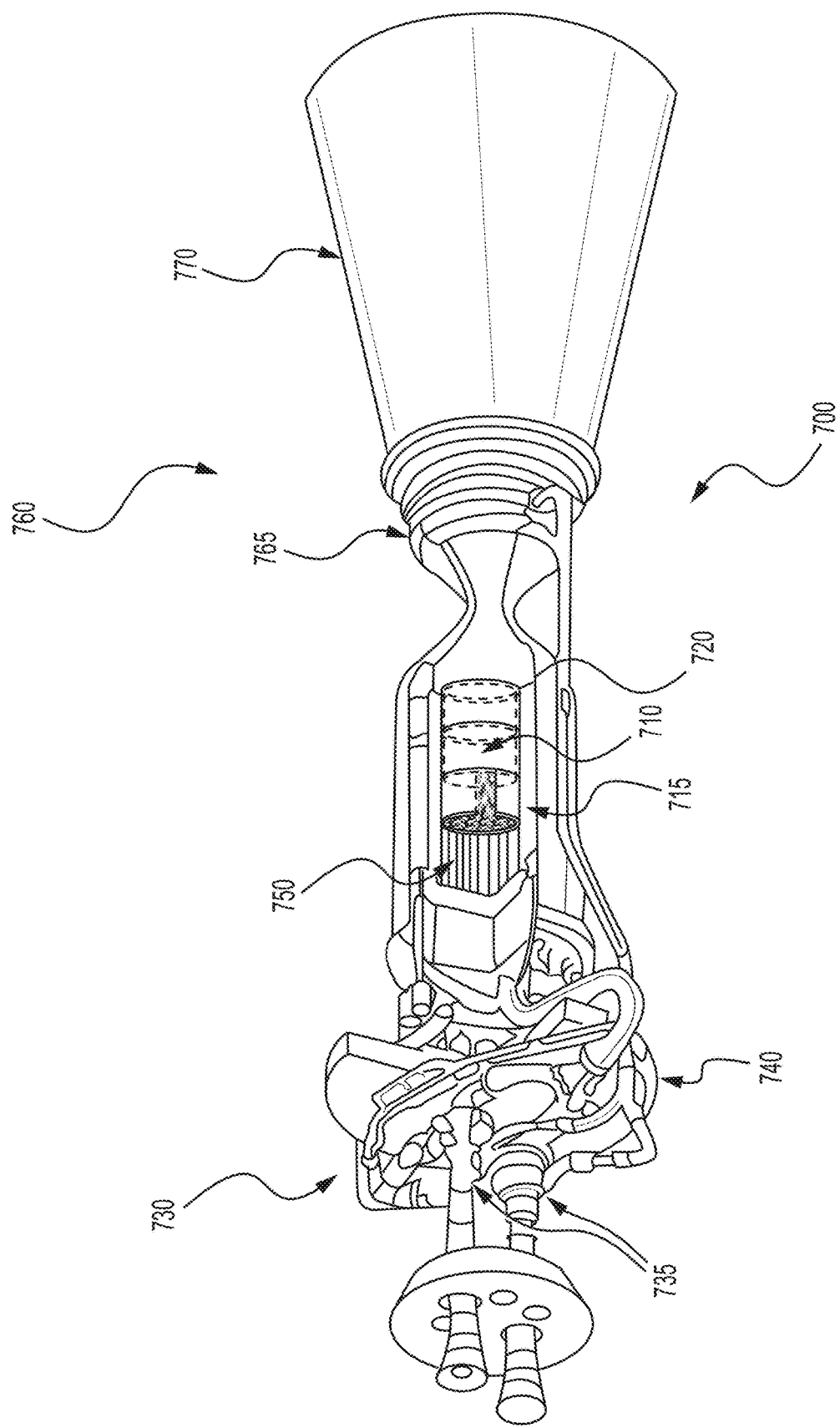
FIG. 9 illustrates structure and arrangement of features a nuclear thermal propulsion reactor incorporating a nuclear reactor structure with an active core region including a plurality of nuclear fuel segments with bodies having a structure with a shape corresponding to a mathematically-based periodic solid.

The disclosed nuclear reactor structure can be assembled into a nuclear thermal propulsion engine. FIG. 9 illustrates, in partial cut-away view, an example of a nuclear thermal propulsion engine. The example nuclear thermal propulsion engine 700 comprises the nuclear reactor structure 710 with an active core region formed from a plurality of nuclear fuel segments. The nuclear reactor structure, active core region, and nuclear fuel segments can be as in any one of the embodiments disclosed herein. The nuclear reactor structure 710 is contained within a reflector 715 and the nuclear reactor structure 710/reflector 715 is housed within an interior volume of a hull 720. The nuclear reactor structure 710 is operatively connected to turbomachinery 730 including turbo pumps 735 and other piping and support equipment 740, including a reservoir for cryogenically storing propulsion gas. Shielding 750 separates the turbomachinery 730 from components in the hull 720. The shielding 750, turbomachinery 730, and the reservoir are operatively mounted to a first end of the hull 720 to provide a flow path from the reservoir to the nuclear reactor structure 710. The nuclear thermal propulsion engine 700 also includes a nozzle section 760 including a nozzle 765 and a nozzle skirt 770. The nozzle 765 is operatively mounted to the second end of the hull 720 to provide a flow path for superheated propulsion gas exiting the nuclear propulsion reactor 710.

A nuclear fuel lattice structure, such as body 205 of the nuclear fuel segment 200, can be manufactured by an additive manufacturing technique. A large number of such manufacturing processes may be applied. The main differences between processes are in the way layers are deposited to create parts and in the materials that are used, each method/material having advantages and drawbacks. Some methods melt or soften the material to produce the layers. Examples include fused filament fabrication (FFF), also known as fused deposition modeling (FDM), fused particle fabrication (FPF) or fused granular fabrication (FGF), which produces components by extruding small beads or streams of material which harden immediately to form layers. Other methods cure liquid materials using different technologies, each of which solidifies the liquid material in a layer-by-layer approach to build up the manufactured object. Examples include stereolithography (SL) utilizing various optical- or chemical-based curing processes (with associated opto-reactive or chemi-reactive materials). In each instance, the manufactured product has properties based on the material of manufacture.

An additive manufacturing protocol can be developed and/or adapted for use in any suitable additive manufacturing process. The protocol is based, at least in part, on embodying a mathematically-based periodic solid in a gridded mesh and sectioning the gridded mesh into a plurality of layers. The protocol includes control instructions for each of the plurality of layers to control an additive manufacturing process to deposit a fissionable fuel composition to manufacture a body having a structure with a shape corresponding to the mathematically-based periodic solid. As disclosed herein, the surfaces of the mathematically-based periodic solid define a plurality of channels in the body.

Example additive manufacturing techniques include ceramic 3D printing techniques such as digital light projection, binder jetting, and EBeam initiated 3D printing. Other suitable manufacturing techniques include photolithography, ceramic material extrusion, and thermoset polymer ceramic material extrusion. Suitable additive manufacturing processes are disclosed in ISO/ASTM52900-15, which defines categories of additive manufacturing processes, including: binder jetting, directed energy deposition, material extrusion, material jetting, powder bed fusion, sheet lamination, and photopolymerization. The contents of ISO/ASTM52900-15 are incorporated herein by reference. Stereolithography is a form of additive manufacturing using photopolymerization processes. In example embodiments, stereolithographic additive manufacturing techniques include photoinitiation from exposure to ultraviolet radiation or beta radiation. In some example embodiments, the ultraviolet radiation is generated in a digital light processor (DLP) or in a stereolithography apparatus (SLA). In other example embodiments, the beta radiation is generated in electron-beam (EBeam) equipment or electron irradiation (EBI) equipment.

When manufactured by an additive manufacturing technique, a solution including a fissionable fuel material or a cladding material or mixtures thereof can be utilized by additive manufacturing equipment controlled by an additive manufacturing protocol. The additive manufacturing protocol provides control instructions to the additive manufacturing equipment to selectively deposit materials from the solution on a layer-by-layer basis to form a green body. The green-body can then be debindered, for example, in a sintering process, to form a ceramic structure. The ceramic structure can be further processed, including adding a coating layer, for example by vapor deposition, submerging in a bath, or spray coating. In some embodiments, the cladding can be made integrally with surfaces of the TPMS and, as necessary, subsequently processed, such as by sintering.

Additionally, although the disclosed reactor and core have complex mechanical geometries, integral and iterative manufacturing on a layer-by-layer basis using additive manufacturing techniques, such as 3D printing, of elemental metal or metal alloys enables the structure and features disclosed herein to be more easily manufactured.

The disclosed arrangements pertain to any configuration in which a heat generating source including a fissionable nuclear fuel composition, whether a body of a nuclear fuel segment or the fissionable nuclear fuel composition per se, and whether surrounded by cladding or not. Although also described herein in connection with a gas-cooled nuclear thermal propulsion reactors (NTP reactors), the structures and methods disclosed herein can also be applicable to other fission reactor systems. Nuclear propulsion fission reactor structures disclosed herein can be used in suitable applications including, but not limited to, non-terrestrial power applications, space power, space propulsion, and naval applications, including submersibles.

Although the present invention has been described in connection with embodiments thereof, it will be appreciated by those skilled in the art that additions, deletions, modifications, and substitutions not specifically described may be made without departure from the spirit and scope of the invention as defined in the appended claims. For example, although described in relation to fissionable fuel materials, nuclear reactors, and associated components, the principles, compositions, structures, features, arrangements and processes described herein can also apply to other materials, other compositions, other structures, other features, other arrangements and other processes as well as to their manufacture and to other reactor types.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapped, interweaved, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:

1. A nuclear fuel lattice structure, comprising:
   a body having a structure including a plurality of webbings having outer surfaces that define a network of interconnected channels located within an envelope surface of the body,
   wherein a baseline of the webbings is an implicit surface of a mathematically-based periodic solid,
   wherein the mathematically-based periodic solid is a triply periodic minimal surface (TPMS),
   wherein at least a portion of the channels extend from a first outer surface of the body to a second outer surface of the body,
   wherein the structure has a volumetric density of 35% to 85%,
   wherein a composition of the structure includes a nuclear fissionable fuel having an enrichment of up to 20%, and
   wherein a specific enrichment of the structure (% enrichment per unit volume) is constant ±2%.

2. The nuclear fuel lattice structure according to claim 1, wherein the triply periodic minimal surface (TPMS) is a gyroid structure, and wherein the implicit surface is defined by a gyroid equation (sin x cos y+sin y cos z+sin z cos x)=0.

3. The nuclear fuel lattice structure according to claim 2, wherein each webbing has a thickness relative to the baseline, and, within the body, the thickness of the webbing varies in accordance with a vector field.

4. The nuclear fuel lattice structure according to claim 3, wherein the thickness of the webbings is symmetric relative to the baseline.

5. The nuclear fuel lattice structure according to claim 1, wherein a uranium content of the nuclear fissionable fuel varies by spatial location in the body.

6. The nuclear fuel lattice structure according to claim 5, wherein the variation in uranium content by spatial location in the body includes increasing a content of U235 due to an increased density of the lattice.

7. The nuclear fuel lattice structure according to claim 1, wherein the mathematically-based periodic solid is biased to effect a flow rate of a medium flowing through the network of interconnected channels.

8. The nuclear fuel lattice structure according to claim 1, wherein the body is disc-shaped and occupies a volume that includes a radial side surface corresponding to a thickness of the body between the first outer surface and the second outer surface.

9. The nuclear fuel lattice structure according to claim 1, wherein the triply periodic minimal surface (TPMS) is a Schwarz minimal surface.

10. The nuclear fuel lattice structure according to claim 1, wherein the nuclear fissionable fuel is high-assay low-enriched uranium (HALEU) with a $U^{235}$ assay equal to or greater than 5 percent to equal to or lower than 20 percent.

11. The nuclear fuel lattice structure according to claim 1, wherein the nuclear fissionable fuel includes uranium oxide that is less than 20% enriched, uranium with 10 wt. % molybdenum (U-10Mo), uranium nitride (UN), or a cermet thereof.

12. The nuclear fuel lattice structure according to claim 3, wherein the thickness of the webbings is asymmetric relative to the baseline.

13. A nuclear fuel segment, comprising:
    the nuclear fuel lattice structure according to claim 1; and
    a cladding layer deposited on the outer surfaces of the plurality of webbings that define the network of interconnected channels.

14. The nuclear fuel segment according to claim 13, wherein the cladding layer has a composition including molybdenum, tungsten, rhenium, tantalum, hafnium and alloys thereof, including carbides.

15. A nuclear reactor structure, comprising:
    an active core region including a plurality of nuclear fuel segments according to claim 13,
    wherein the plurality of nuclear fuel segments are arranged along an axial centerline defining a longitudinal axis of the nuclear reactor structure.

16. The nuclear reactor structure according to claim 15, wherein the network of interconnected channels in the body of adjacent nuclear fuel segments are aligned to provide fluid communication from a first end surface of the active core to a second end surface of the active core.

17. A nuclear thermal propulsion engine, comprising:
    the nuclear reactor structure according to claim 15, wherein the nuclear reactor structure is housed within an interior volume of a hull;
    shielding;
    a reservoir for cryogenically storing propulsion gas;
    turbomachinery; and
    a nozzle, wherein the shielding, the turbomachinery, and the reservoir are operatively mounted to a first end of the hull to provide a flow path from the reservoir to the nuclear reactor structure, and wherein the nozzle is operatively mounted to a second end of the hull to provide a flow path for superheated propulsion gas exiting the nuclear thermal propulsion engine.

* * * * *